Figure 1:
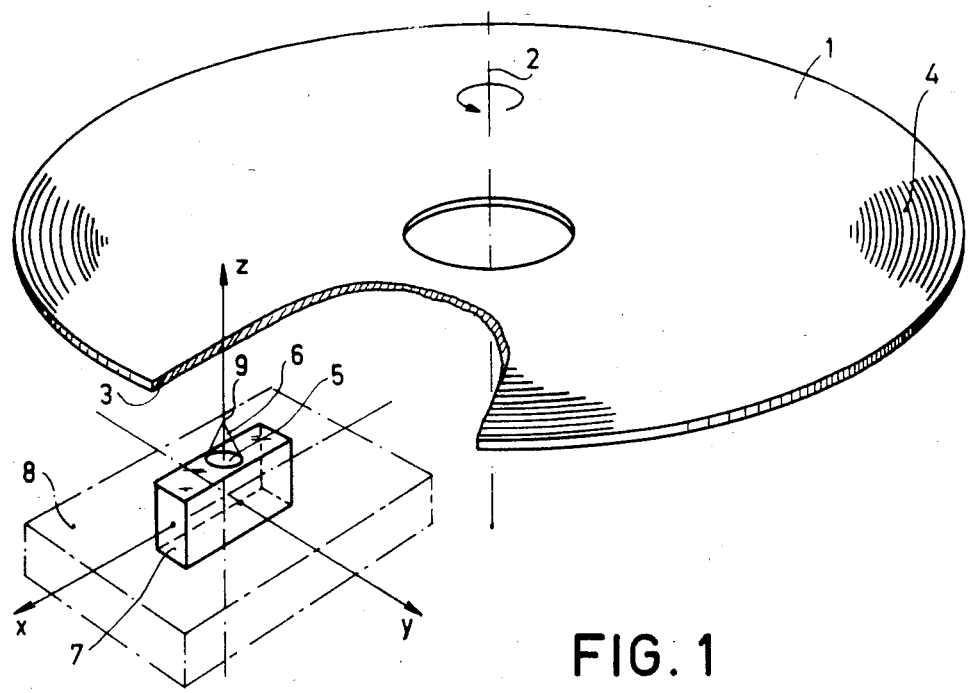

United States Patent [19]

Janssen et al.

[11] Patent Number: 4,561,081

[45] Date of Patent: Dec. 24, 1985

[54] OPTO-ELECTRONIC APPARATUS FOR INSCRIBING AND/OR READING RECORDING TRACKS BY MEANS OF A RADIATION BEAM

[75] Inventors: Peter J. M. Janssen; Gerard E. van Rosmalen, both of Eindhoven, Netherlands

[73] Assignee: U.S. Philips Corporation, New York, N.Y.

[21] Appl. No.: 313,701

[22] Filed: Oct. 21, 1981

[30] Foreign Application Priority Data

Jul. 10, 1981 [NL] Netherlands ............... 8103305

[51] Int. Cl.⁴ .................... G11B 7/00; G11B 21/10
[52] U.S. Cl. ............................. 369/45; 369/46
[58] Field of Search ................... 369/43–46, 369/109–112; 250/201, 570; 350/247, 255

[56] References Cited

U.S. PATENT DOCUMENTS

| | | | |
|---|---|---|---|
| 4,135,083 | 1/1979 | Van Alem et al. | 369/45 |
| 4,135,206 | 1/1979 | Kleuters et al. | 369/45 |
| 4,175,832 | 11/1979 | Umeki et al. | 369/45 |
| 4,302,830 | 11/1981 | Hamaoka et al. | 369/44 |
| 4,321,701 | 3/1982 | Arquie et al. | 369/45 |
| 4,374,324 | 2/1983 | Van Rosmalen et al. | 250/201 |
| 4,419,614 | 12/1983 | Kimura | 350/255 |

FOREIGN PATENT DOCUMENTS

| | | | |
|---|---|---|---|
| 56-80834 | 7/1981 | Japan | 369/45 |
| 56-119944 | 9/1981 | Japan | 369/45 |

Primary Examiner—Aristotelis M. Psitos
Attorney, Agent, or Firm—Robert T. Mayer; Algy Tamoshunas

[57] ABSTRACT

An opto-electronic apparatus for inscribing and/or reading recording tracks on a record carrier by means of a radiation beam comprises an objective mounted in an objective holder. The objective holder is supported in a frame by bearing arrangement for movement in accordance with a number of desired degrees of freedom and the apparatus includes electromagnetic actuator means for driving the objective holder in accordance with the desired directions of movement. The bearing arrangement of the objective holder on the frame comprises electromagnetic bearing means for counteracting movements in accordance with at least one undesired degree of freedom. An objective-position measuring device supplies a positional error signal which represents the deviation of the objective holder in accordance with the undesired degree of freedom relative to the frame and which is utilized by a levitation control circuit which counteracts movement of the objective holder relative to the frame in accordance with the undesired degree of freedom by means of electromagnetic levitation forces.

18 Claims, 20 Drawing Figures

OPTO-ELECTRONIC APPARATUS FOR INSCRIBING AND/OR READING RECORDING TRACKS BY MEANS OF A RADIATION BEAM

The invention relates to an opto-electronic apparatus for inscribing and/or reading recording tracks in a recording surface of a record carrier by means of a radiation beam, such as the scanning by means of a light beam of video and/or audio recording tracks or digital data recording tracks in a reflecting recording surface of a rotating video or audio disc or a digital data disc respectively. Such apparatus comprises: a frame; an objective holder provided with an objective having an optical axis and having a lens system for concentrating the radiation beam so as to form a radiation spot in a focusing plane; a bearing arrangement for the objective holder, which arrangement comprises bearing means which permit movements of the objective holder relative to the frame in accordance with a desired number of degrees of freedom out of six theoretically possible, independent degrees of freedom and which substantially counteract these movements of the objective holder relative to the frame which are in accordance with the other, undesired degrees of freedom and actuator means, which are connected to the frame and to the objective holder and which magnetically co-operate with each other via an air gap, for driving the objective holder relative to the frame with electromagnetic actuator forces in accordance with the said desired degrees of freedom, which actuator means comprise at least one actuator coil for each desired degree of freedom.

The theoretical background of the invention is explained with reference to FIG. 1. An optical disc 1 rotates about an axis of rotation 2. The disc comprises a transparent substrate 3, on whose upper surface recording tracks 4 are located. A symbolically represented objective 5 scans the recording tracks of the optical disc by means of a light beam 6. The objective is mounted in an objective holder 7, which is supported by a frame 8. The origin of an orthogonal X-Y-Z system of axes is situated in the centre of the objective. The Z-axis is parallel to the axis of rotation 2 of the optical disc and the X-axis intersects the axis of rotation 2 perpendicularly, so that the X-axis is parallel to a radial line of the optical disc. The Y-axis is perpendicular to both the X-axis and the Z-axis and consequently extends in a tangential direction. The six independent degrees of freedom of the objective holder 7 and thus of the objevtive 5 which are theoretically possible are translations in accordance with the three axes and rotations about these axes. This yields a total of three translations and three rotations, so that six independent degrees of freedom are obtained.

In principle, any material body can move in accordance with six independent degrees of freedom. In principle, a bearing arrangement is a device which serves to ensure that a material body can only perform movements in accordance with some of the theoretically possible independent degrees of freedom, namely the desired degrees of freedom, and which counteracts movements in accordance with all the other degrees of freedom. Most bearing arrangements allow only one or two movements, for example a single rotation or translation, a combination of the two, or two rotations. Opto-electronic devices for inscribing and/or reading recording tracks on a rotating optical disc are known, in which the objective holder can move in accordance with two or three degrees of freedom. Movements in the direction of the Z-axis are required in order to focus the radiation beam on the recording tracks. Movements in the direction of the X-axis may be required in order to follow oscillations of the recording tracks. Finally, movements in the direction of the Y-axis may be required in order to correct time errors owing to an eccentricity of the recording tracks as described in U.S. Pat. No. 4,135,206.

For correct movement of the objective holder in accordance with the desired degrees of freedom, electronic control circuits are required. Such circuits determine deviations of the radiation spot relative to the track in accordance with said axes and which ensure that the objective holder performs the appropriate compensating movements. The optical disc reflects the light beam and modulates it with the information contained in the recording tracks. The light beam modulation is converted into an electrical modulation, so that an electric signal is obtained which contains the information stored in the optical disc. This signal also contains information on the position of the light spot relative to the recording track to be followed, so that error signals for said control circuits can be derived from this signal. Thus, the position of the objective holder in accordance with said axes is determined dynamically by the control circuits and the objective holder is free to move in accordance with said desired degrees of freedom. The bearing arrangement of the objective holder is such that the objective holder is capable of performing the desired movements.

Alternative versions of opto-electronic devices are known in which, instead of a translation of the objective holder in accordance with the X-axis, a rotation about the Y-axis is used. Instead of a small translation in accordance with the Y-axis it is possible to use a small rotation about the X-axis. Since the optical disc in the version shown is flat, small rotations about the X or the Y-axis will give rise to a certain focussing error of the light beam 6, but this error is so small that no significant interaction with the control of the translations in accordance with the Z-axis will occur. Moreover, opto-electronic devices are known, for example from U.S. Pat. No. 4,021,101, in which the bearing arrangement only permits movements in accordance with the Z-axis. For moving the radiation spot 9 in directions along the X-axis and the Y-axis, the objective is not moved, but the light beam is moved relative to the objective by means of an electromagnetically actuated mirror. Such an electromagnetically actuated mirror is, for example, known from U.S. Pat. No. 4,129,930.

Generally, the compensation movements of the objective holder should be effected with high speed, which means that the required control circuits should have a large dynamic bandwidth. Bandwidths of at least 3 kHz are desirable, but preferably they should be 5 kHz. It has been found that the bearing arrangements of objective holders and of pivoting mirrors used until now substantially limit the desired bandwidths. This is because the bearing arrangements comprise either surfaces which frictionally cooperate with each other or moving elastic parts, which introduce a difficult-to-control amount of frictional damping or internal damping into the control system. Resonance phenomena in the bearing arrangement also give rise to problems. In the case of bearing arrangements with moving elastic parts, the choice of the spring constant of the elastic parts is a difficult problem. If the stiffness is too low this gives rise to resonances at low frequencies and if the stiffness is too high the power required for driving is too high, giving rise to problems with respect to heat dissipation and the dimensioning of the control circuits.

It is an object of the invention to improve opto-electronic apparatus of the type mentioned in the opening paragraph in such a way that large bandwidths are attainable with a low power consumption. To this end the invention is characterized in that the apparatus comprises an objective-position measuring device for continuously measuring the position of the objective holder relative to the frame in accordance with at least one of the undesired degrees of freedom and generating a positional-error signal. The bearing arrangement comprises bearing means connected to the frame and the objective holder, respectively, and which magnetically co-operate with each other via an air gap for counteracting undesired movements of the objective holder in accordance with at least one of said undesired degrees of freedom by means of electromagnetic levitation forces, which means comprise at least one levitation coil for each undesired degree of freedom in accordance with which an undesired movement of the objective holder is counteracted by electromagnetic levitation forces. The apparatus is provided with a levitation control circuit, which compares the positional error signal from the objective-position measuring device with a reference signal of specific value. The control circuit has at least one output for applying an electric levitation current, whose value depends on the error signal, to a levitation coil for maintaining the position of the objective relative to the frame in accordance with an undesired degree of freedom substantially constant.

The word "levitation" in a narrower sense means balancing the force of gravity. In the present text the word is used in a broader sense in order to indicate that the objective holder is supported by the frame in a substantially invariable position, by remotely exerted field forces, in relation to one or more degrees of freedom.

The optoelectronic apparatus in accordance with the invention employs two different types of control circuits. The position of the light spot relative to the recording tracks on the record carrier is controlled by focussing and scanning control circuits, being actuator control circuits, which automatically control the position of the objective and eventually also of other optical elements such as an articulated mirror relative to the recording surface of the disc. Deviations in the position of the recording surface at the location of the light spot owing to an oblique position of the disc or undulations in the recording surface, deviations of the position of the recording track owing to an eccentricity of the disc centre relative to an axis of rotation etc., are automatically compensated by these actuator control circuits. In addition, there are provided one or more levitation control circuits in accordance with the invention, which do not control the position of the objective relative to the recording surface and the recording track to be followed, but relative to the frame of the apparatus. Thus, the levitation control circuits have a distinctly different function and should be regarded as a part of the electromagnetic bearing arrangement of the objective on the frame. The absence of mechanical damping and resonance in the electromagnetic part of the bearing arrangement permits a larger bandwidth of the control circuits which control the desired movements of the objective.

In one embodiment of the invention all bearing means for counteracting movements of the objective holder in accordance with undesired degrees of freedom exclusively comprise electromagnetic bearing means, so that the objective holder is exclusively supported on the frame by electromagnetic actuator forces and by electromagnetic levitation forces. In such an embodiment of the invention not a single kind of mechanical damping or resonance occurs, the objective holder is entirely free-floating in space and is only subject to field forces, namely those as a result of the gravitational field of the earth and the magnetic fields produced by the actuator and levitation coils. Such an opto-electronic apparatus can be stable from the point of view of control technology. For the stability, a certain damping is necessary, which can be provided in the electronic control circuits and whose value is optional and easy-to-control.

Figure 4:
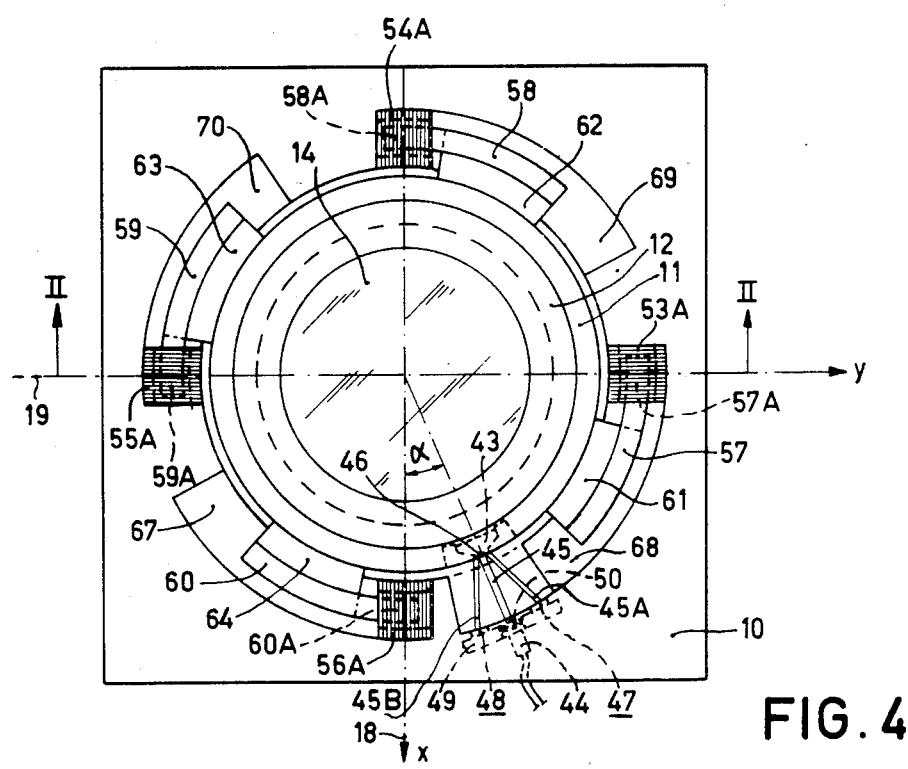
Figure 2:
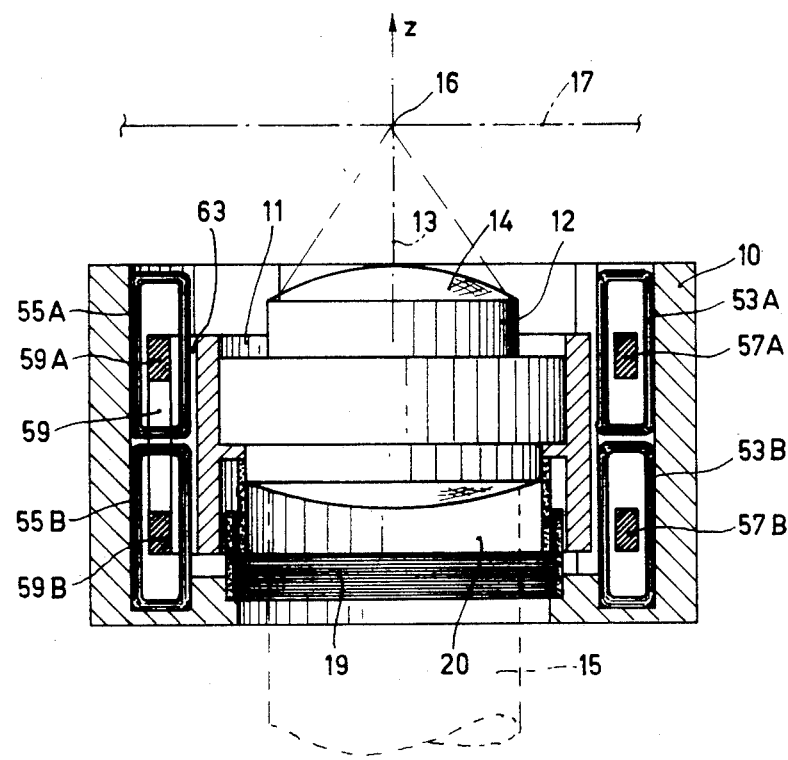
Figure 3:
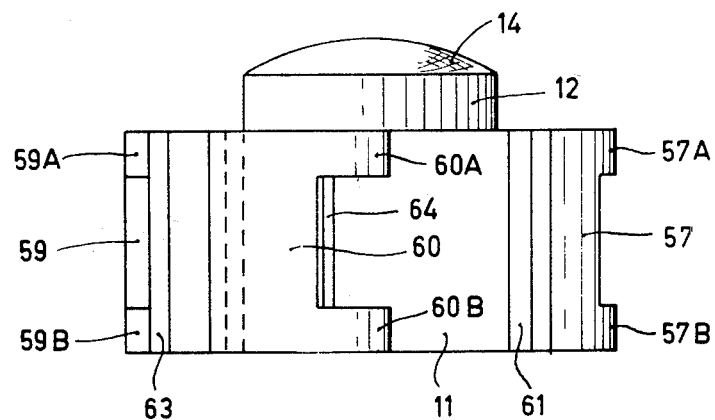

When such a fully free-floating objective holder is required, an embodiment of the invention may be used, which is characterized in that: the objective holder is ferromagnetic and annular; in that at least three ferromagnetic armatures are arranged on the objective holder at equal diametrical distances from the optical axis, uniformly spaced along the circumference; that a radially magnetized permanent magnet is arranged between each armature and the objective holder; that each armature comprises two teeth which extend in a substantially tangential direction and which, viewed along the optical axis of the objective, are axially spaced from each other; that for each armature tooth an axially elongate combination coil is arranged on the frame, which coil functions both as actuator coil and as levitation coil and comprises turns which are disposed substantially in a plane which extends through the optical axis of the objective and a central opening which receives the tooth with clearance; and that for translations along the optical axis there is provided an actuator coil which is concentric with the optical axis. An opto-electronic apparatus in this embodiment may comprise six combination coils and one further actuator coil in total. In the description an embodiment will be described comprising eight combination coils and one further actuator coil (FIGS. 2–4).

It is possible to employ an embodiment of the invention comprising an objective holder, which may be fully free-floating and which is at least partly made of a ferromagnetic material, which embodiment is characterized in that all actuator coils and levitation coils are rigidly mounted on the frame and magnetically cooperate with ferromagnetic parts of the objective holder. In principle, it is favourable to use an embodiment without moving coils. A disadvantage of moving coils is that a movable connection is required between the coil and an electronic control circuit, which connection may give rise to problems because of its mobility.

An embodiment of the invention requiring neither moving coils nor permanent magnets is characterized in that: the objective holder comprises a ferromagnetic mounting ring which is concentric with the optical axis of the objective; for movements in accordance with all the degrees of freedom of the objective, except for rotations about the optical axis, a plurality of coils, which are situated on different axial sides of the mounting ring and which exert axially opposite magnetic force components on the mounting ring, and a plurality coils, which are situated on diametrically different sides of the mounting ring and which exert dimetrically opposite magnetic force components on the mounting ring, are arranged on the frame, which coils function as actuator coils, as levitation coils, or both as actuator coils and levitation coils.

A further embodiment of the invention is characterized in that the bearing arrangement only permits objective-holder movements relative to the frame in accordance with two desired degrees of freedom in a single plane of movement, namely in accordance with a first, in itself desired, degree of freedom along a first translation axis which coincides with the optical axis of the objective, and in accordance with a second, in itself desired, degree of freedom along a second translation axis which is perpendicular to the first translation axis, and in that for electromagnetically driving the objective holder in accordance with the second translation axis and for electromagnetically counteracting movements of the objective holder in accordance with a third, in itself undesired, degree of freedom about an axis of rotation which is perpendicular to the first and second translation axes, there are provided combined electromagnetic means comprising at least a first and a second combination coil, which function both as actuator coils and levitation coils, which two combination coils are spaced from each other, viewed along the second translation axis.

Such an embodiment is especially suitable for an objective holder which should move in the X-Z plane only. The moving mass, comprising the objective, the objective holder and the associated moving coil, can then be minimized. In this respect an embodiment may be of interest, which is characterized in that: the objective holder is movable relative to the frame along the second translation axis over a distance of not more than a few millimeters; that there are provided two sets of combination coils, which are disposed at opposite sides of the objective holder, viewed in accordance with the first translation axis; and in that there is provided an actuator coil which is substantially concentric with the optical axis of the objective holder for exerting actuator forces along the optical axis of the objective.

This embodiment requires at least the four combination coils and one actuator coil. In the usual manner the combination coils at the sides of the objective holder and the actuator coil at the lower end of the objective holder may cooperate with permanent magnet on the frame, relative to which they only perform a limited stroke. If such an opto-electronic apparatus is used for reading, for example, the recording tracks of a rotating video disc, the entire frame should be slowly movable along the X-axis. This may be referred to as a semi-stationary system. The use of such devices in video disc players is known. The slow movement along the X-axis is also controlled by means of a control circuit. Thus, for following the recording track two control circuits are necessary, one fast actuator control circuit, which causes the objective to move relative to the semi-stationary frame in order to rapidly eliminate minor errors in the position of the recording track during each revolution of the disc, and a slow control circuit for slowly moving the semi-stationary frame in such a way that the objective holder always perform its fast tracking movements with respect to its neutral position relative to the semi-stationary frame.

However, it may be attractive to employ an opto-electronic apparatus in which the bearing arrangement for the objective holder comprises mechanical means for counteracting movements of the objective holder relative to the frame in accordance with at least one or some of the undesired degrees of freedom.

Such an embodiment may lead to favourable dynamic properties, especially if the levitation forces, the actuator forces, the gravitational forces and the dynamic acceleration and deceleration forces only impose a small, suitably negligible load on the mechanical bearing means. The less favourable properties of the mechanical bearing means then have a minor effect or are negligible.

An embodiment of the invention in which this principle is applied to an opto-electronic apparatus of the type mentioned in the foregoing, the objective holder solely performing desired translations in the X-Z plane, is characterized in that: the bearing means, in order to permit only movements of the objective holder in a single plane of movement in accordance with the two said desired degrees of freedom, comprise space guide surfaces, parallel to said plane of movement and in that movements of the objective holder which are not within said plane of movement (X-Z) and consequently are in accordance with the three other degrees of freedom, are substantially counteracted by the guide surfaces. Since the gravitational force, the actuator forces, the levitation forces and the acceleration and deceleration forces do not exert components in the Y-direction, the guide surface are, in principle, not subjected to any mechanical load. Thus, this embodiment combines the simplicity of the mechanical means with the absence of any unfavourable influence on the dynamic bandwidth.

It is possible to employ an embodiment of the invention which bears resemblance to the preceding embodiment but which does not require the use of a movable semi-stationary frame.

In this embodiment the objective holder can travel through a larger range in the X-direction relative to the frame, which can now be stationary. This embodiment of the invention is characterized in that: the objective holder is movable relative to the frame along the second translation axis over a distance which suffices to write and/or read recording tracks over the entire recording surface of a record carrier; in that said at least two combination coils, viewed along each of the two said translation axes and also along a third translation axis which is perpendicular thereto, are spaced from each other; in that the combination coils only exert electromagnetic forces on the objective holder which are directed parallel to the second translation axis; in that an actuator coil is connected to the objective holder for exerting actuator forces which are directed parallel to the first translation axis; and in that the parts of the electromagnetic actuator means and the electromagnetic levitation means connected to the frame comprise a plurality of elongate stator portions which extend along the second translation axis and which have a length which is at least equal to said distance of movement of the objective holder, said coils being movable relative to said elongate stator portions along the second translation axis in such a way that an air gap is left.

Furthermore, use can be made of an embodiment which is characterized in that: said first and second combination coils which are at least present belong to a first set and a second set of combination coils respectively, which coils are disposed in first and second planes substantially parallel to the plane of movement of the objective holder and which are arranged adjacent each other, viewed in a direction parallel to the second translation axis, overlapping each other; that said elongate stator portions comprise elongate permanent-magnetic stators on the frame, which stators have areas of alternate north and south polarity which extend in accordance with a regular pattern in the longitudinal direction; and in that there are provided commutation means for commutating the electric currents to be applied to the combination coils, depending on the position and the direction of movement of the objective holder, viewed along the second translation axis.

The use of commutated combination coils has the advantage that relatively small coils may be used in conjunction with easy-to-manufacture elongate permanent magnets on the frame. In principle, this enables the construction of an opto-electronic apparatus with an almost unlimited range of movement of the objective holder. In practice this range need not be greater than a part of the radius of a rotating recording disc. In contradistinction to the said opto-electronic equipment using a semistationary frame, opto-electronic equipment in the last-mentioned embodiment enables very fast movements over the entire recording and/or reading area and hence very short access times to be obtained.

It may also be advantageous to use an embodiment of the invention which combines the presence of an at least partly ferromagnetic objective holder and coils arranged on the frame only with the fact that the objective holder has a travel relative to the frame of only a few millimeters, combination coils being arranged on both sides of the objective holder and an actuator coil, which is concentric with the optical axis of the objective, being provided for the purpose of focussing. This embodiment may be characterized in that: the objective holder is provided with ferromagnetic objective pole shoes with free ends, which extend in directions parallel to the second translation axis; in that on the frame there are arranged a plurality of ferromagnetic stator pole shoes with free ends, which are disposed opposite the free end of an objective pole shoe, thus forming an air gap; and in that said combination coils are arranged on the stator pole shoes. The use of pole shoes enables greater forces to be imparted to the objective holder by the combination coils, the presence of the objective pole shoes on the objective permitting the formation of a small air gap, between the two types of pole shoes. Furthermore, it is possible to use a further embodiment which is characterized in that: the apparatus comprises at least one permanent magnet for producing a permanent magnetic field in the air gaps between the stator pole shoes and the objective pole shoes; in that the stator pole shoes and the objective pole shoes comprise teeth which face each other and magnetically cooperate with each other via the air gap; and in that the frame comprises a ferromagnetic yoke which magnetically couples the permanent magnets to the stator pole shoes.

The use of one or more permanent magnets provides a higher rigidity of the magnetic bearing arrangement, especially for rotations about the optical axis and translations transverse to the optical axis.

For measuring the position of the objective relative to the frame an embodiment of the invention may be used, which is characterized in that the objective-position measuring device at least comprises: (a) two capacitive elements arranged in series, which elements comprise facing stationary plates of an electrically conductive material on the frame and facing movable plates of an electrically conductive material on the objective holder, (b) a high-frequency alternating-current source, (c) a voltage difference circuit, which is inductively coupled to the high-frequency alternating-current source and connected to the two capacitive elements, and (d) means for applying the output signal of the voltage difference circuit to the levitation control circuit.

The movable plates of an electrically conductive material on the objective holder may have a very low mass and may for example comprise thin metal layers which are physically or chemically deposited. In addition to a capacitive objective-position measuring device it may also be advantageous to use an embodiment of the invention which is characterized in that the apparatus comprises an opto-electronic objective-position measuring device, which device comprises: (a) a radiation source on the frame for emitting a radiation beam towards the objective holder, (b) a radiation-sensitive detection system on the frame, which system comprises a plurality of detectors, each divided into at least two sub-detectors, the separating lines between the sub-detectors being parallel to each other, (c) a beam-splitting optical element on the objective holder for splitting the radiation beam emitted by the radiation source in the direction of the radiation-sensitive detection system into sub-beams, the radiation distribution among the sub-detector being determined by the position of the optical element and thus of the objective holder relative to the frame, and (d) an electronic circuit for supplying positional-error signals, which circuit comprises inputs which are each individually connected to a sub-detector of the detection system.

Such an objective-position measuring device is disclosed in U.S. Pat. No. 4,425,043 (herewith incorporated by reference). Only a small additional mass is added to the moving part of the apparatus, because the beam-splitting element can be small and light. This embodiment of the invention concerns a novel use of the opto-electronic objective-position measuring device described in the said Patent Application in a levitation circuit, for automatically maintaining the position of an objective constant relative to the frame by electronic means.

The invention will now be described in more detail with reference to the drawing, in which the principles of a number of embodiments of the invention are represented and in which:

FIG. 1 shows an optical disc 1 and the optical objective elements 5 and 7.

FIG. 2 is a partly sectional view of an opto-electronic device which permanent magnets, in which the objective holder is fully free-floating relative to a surrounding frame and comprises a plurality of tangentially projecting pole shoes.

Figure 5:
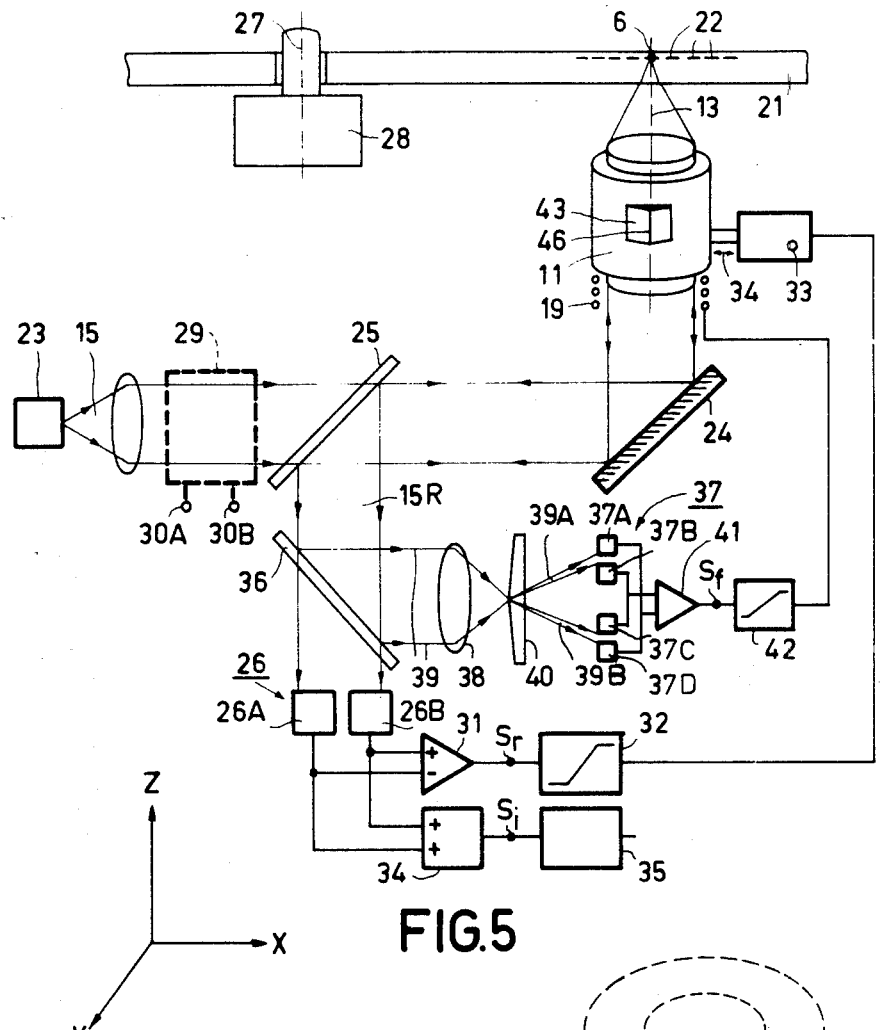
Figure 6:
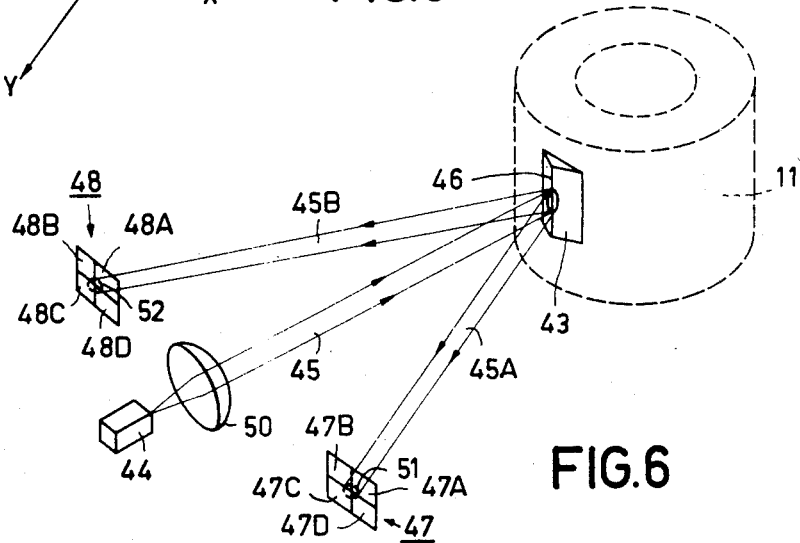
Figure 7:
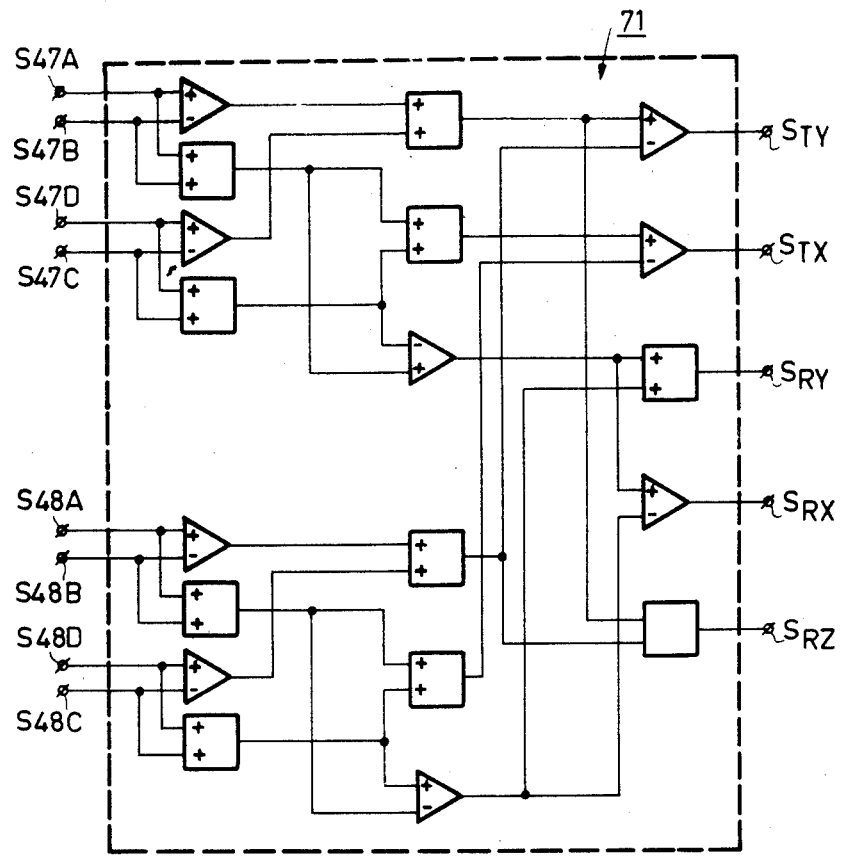
Figure 8:
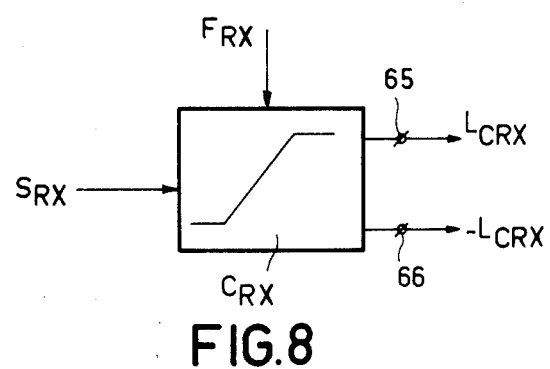
Figure 9:
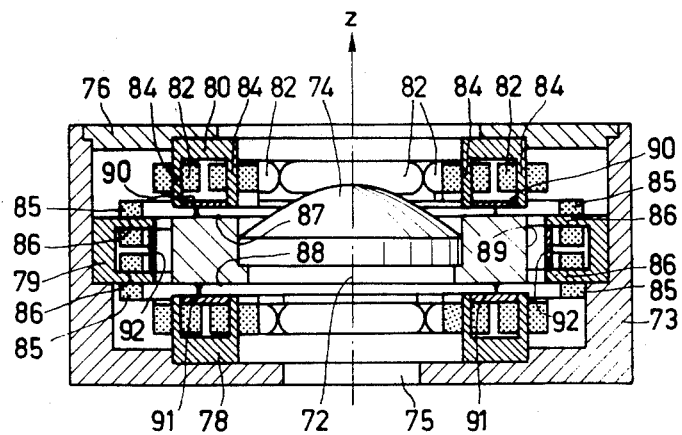
Figure 10:
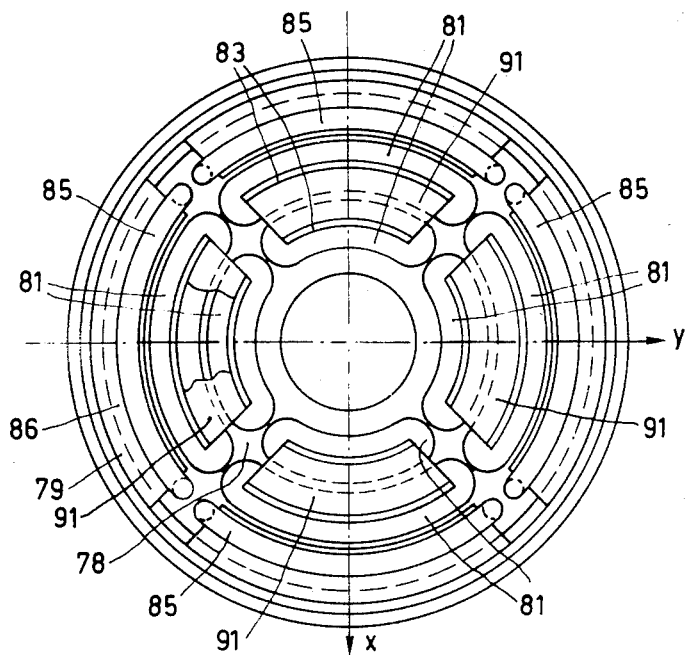
Figure 11:
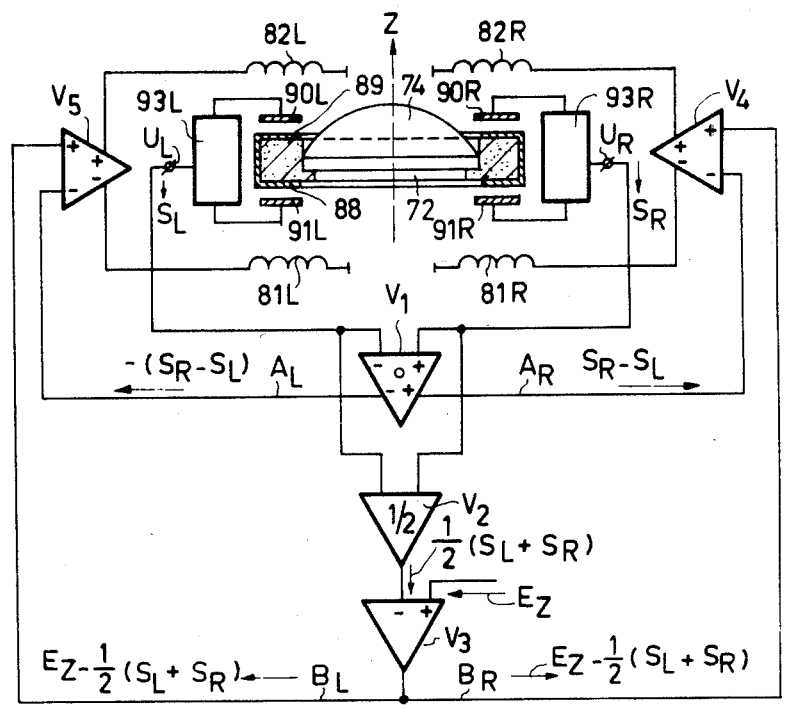
Figure 12:
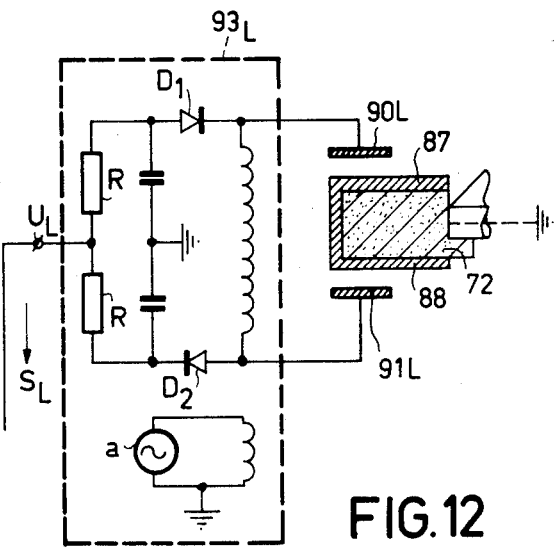
Figure 13:
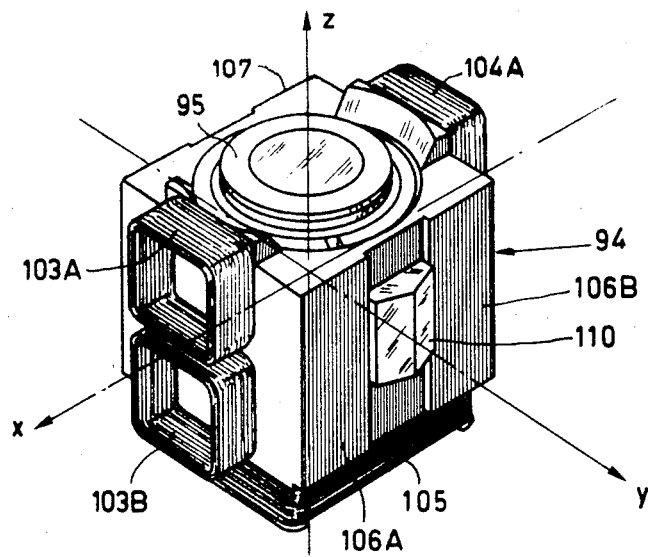
Figure 14:
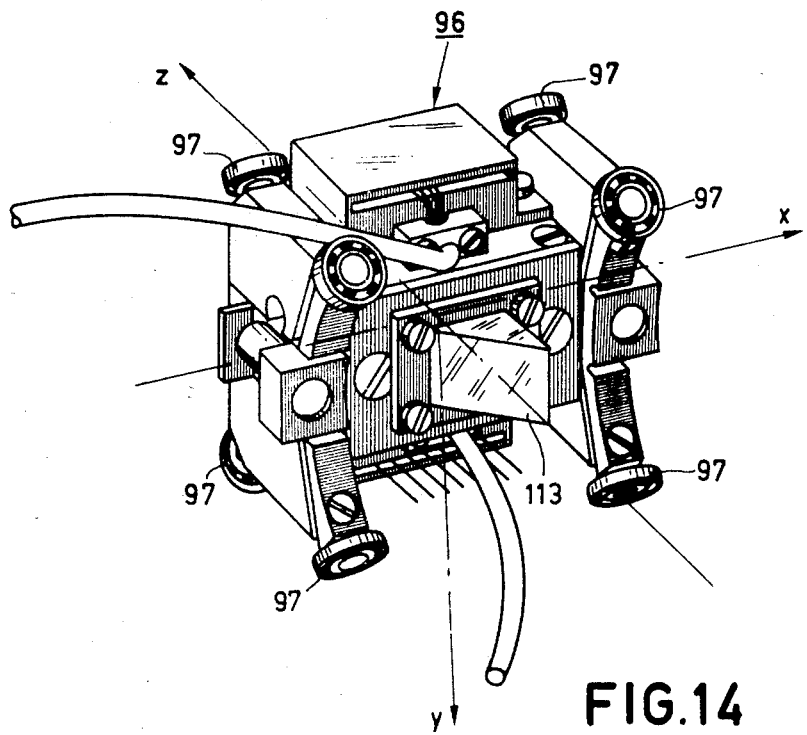
Figure 15:
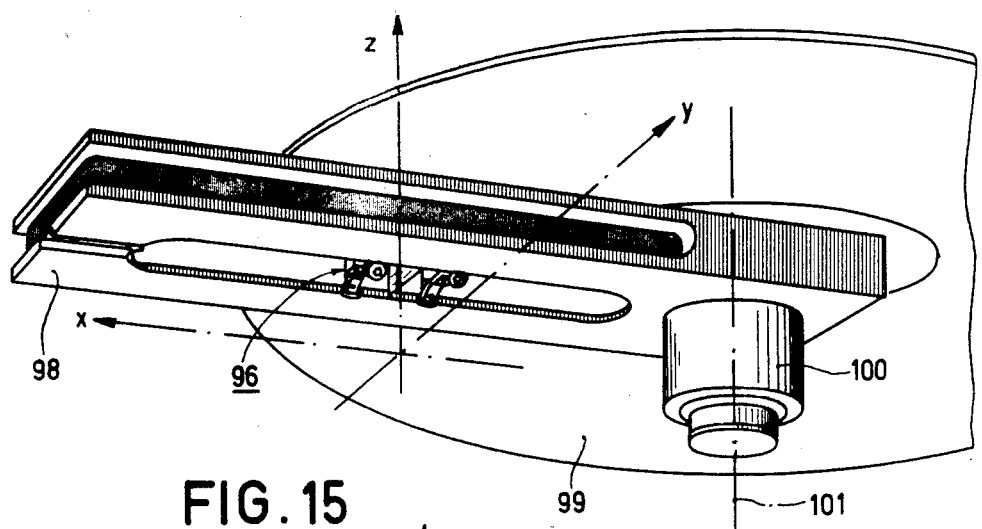
Figure 16:
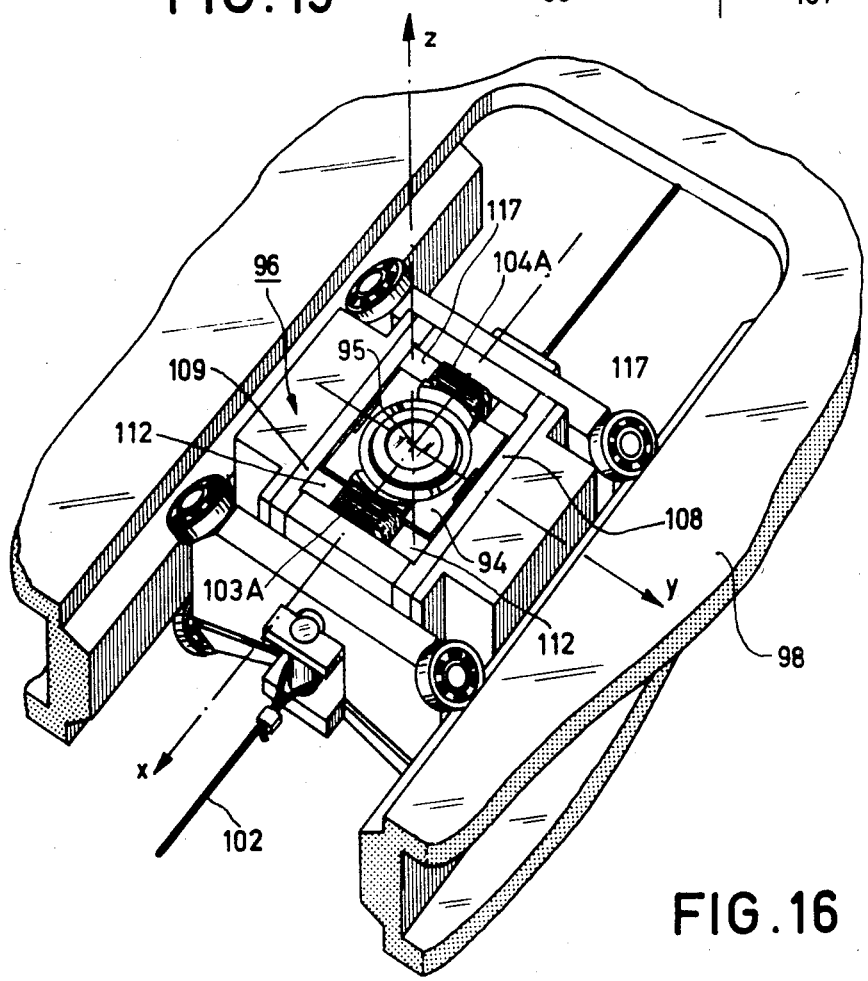
Figure 17:
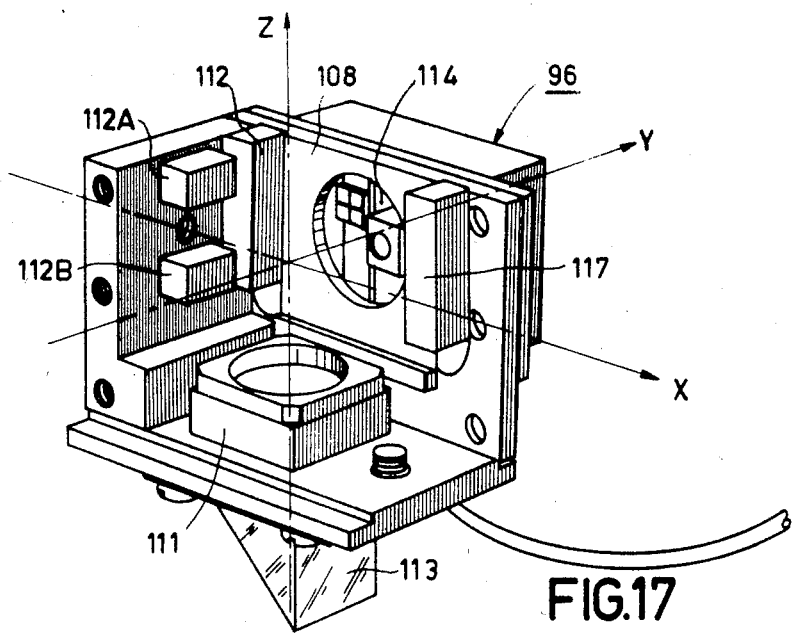
Figure 18:
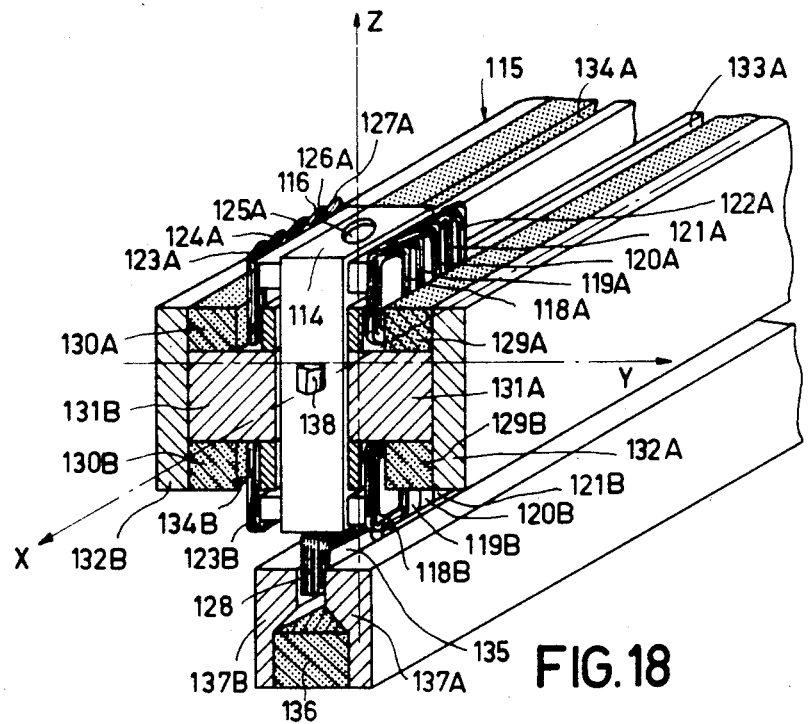
Figure 19:
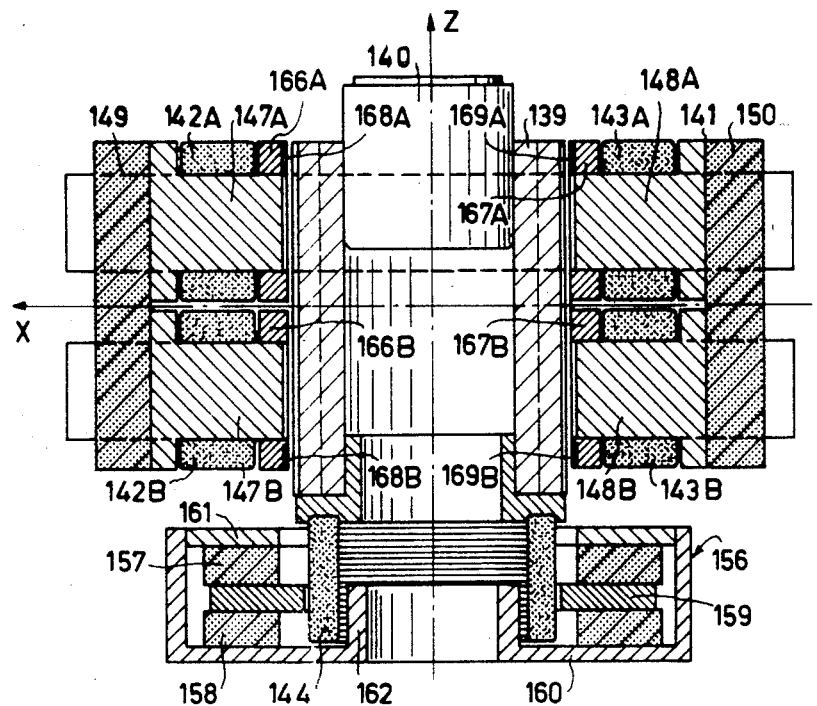
Figure 20:
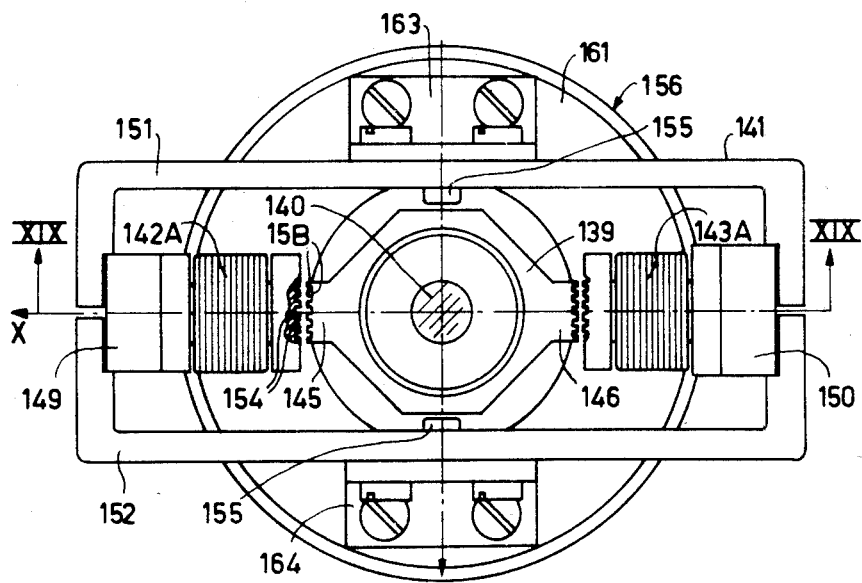

FIG. 3 is a side view of the objective holder with objective in the apparatus of FIG. 2, FIG. 4 is a plan view of the apparatus of FIG. 2, FIG. 5 schematically represents two actuator control systems for the apparatus of FIGS. 2-4, FIG. 6 relates to an objective-position measuring device, FIG. 7 is a circuit diagram of an electronic circuit for generating positional-error signals, FIG. 8 is a symbolic diagram of a levitation control circuit, FIG. 9 is a sectional view of an other embodiment of the invention, which concerns an opto-electronic apparatus without permanent magnets and with an objective which is mounted in a ferromagnetic objective holder which is fully free-floating relative to a surrounding frame in the magnetic field of a number of combination coils, FIG. 10 is a plan view of the apparatus of FIG. 9, some of the parts being omitted for the sake of clarity, FIG. 11 schematically represents a levitation circuit for the apparatus of FIGS. 9 and 10, FIG. 12 is a circuit diagram of a capacitive objective-position measuring device for use in conjunction with the levitation control circuit of FIG. 11, FIG. 13 shows an objective holder for use in an other embodiment of the invention, which comprises optical-position detection means and which is movable in the X-Z plane only, FIG. 14 is a perspective bottom view of a semi-stationary frame for an objective holder in accordance with FIG. 13, FIG. 15 is a perspective bottom view of an optical storage-disc apparatus employing the objective holder of FIG. 13 and the frame of FIG. 14, FIG. 16 is a perspective plan view of a part of the apparatus of FIG. 15, FIG. 17 is a perspective view of the semi-stationary frame of FIG. 14 from a different direction and with the omission of a number of parts, FIG. 18 in perspective illustrates the principle of an other opto-electronic apparatus comprising an objective holder with a large range of movement, FIG. 19 is a section view of a further opto-electronic apparatus in which the objective holder is provided with magnetic pole shoes which are disposed opposite pole shoes of a permanent magnetic stator yoke, and FIG. 20 is a plan view of the apparatus of FIG. 19.

All the embodiments of an opto-electronic apparatus shown in the drawing are in principle intended for scanning video and/or audio recording tracks or digital data recording tracks in a reflecting recording surface of a rotating disc by means of a laser light beam. However, they may also be used for recording and/or reading the recording tracks in a recording surface of a different type of record carrier, for example a rectangular record carrier which is linearly reciprocated or record carriers which are stationary.

The opto-electronic apparatus shown in FIGS. 2 to 4 comprises a frame 10 and an objective holder 11, which is provided with an objective 12 having an optical axis 13. The objective 12 is only shown schematically and has a lens system which comprises a bi-aspherical lens 14. The objective 12 concentrates a light beam 15 so as to form a light spot 16 in a focussing plane 17. The desired degrees of freedom comprise translations in accordance with the Z-axis, that is the optical axis 13, so-called focussing movements, translations in accordance with an X-axis 18 perpendicular to the Z-axis, so-called tracking movements, and translations in accordance with a Y-axis 19, which is perpendicular to the X-axis as well as to the Z-axis, so-called time error correction movements. The bearing arrangement for the objective holder 11 relative to the frame allows said movements in accordance with said desired degrees of freedom but substantially counteracts movements in accordance with the three other degrees of freedom. For driving the objective holder in the Z-direction, there is provided an annular actuator coil 19. The objective holder carries an annular and axially magnetized permanent magnet 20, which is coaxially movable within the coil 19 with clearance, so that the actuator coil and the permanent magnet magnetically cooperate with each other via an air gap formed between them.

The actuator coil 19 is included in a focussing system which falls beyond the scope of the invention and which serves to ensure that the focussing plane 17 constantly coincides with the recording surface of a video disc. This will be explained later, with reference to FIG. 5 which schematically represents the opto-electronic apparatus of FIGS. 2 to 4 when used in an apparatus for reading a video disc 21.

The disc-shaped video record is shown in a radial cross-section in FIG. 5 with the recording tracks 22 extending perpendicularly to the plane of drawing, that is in the Y-direction. The light beam 15 produced by a light source 23, for example a gas laser or a semiconductor diode laser, is reflected to the video disc by a mirror 24. The beam is focussed by the objective 12 to form the radiation spot 16 of minimal dimensions on the reflecting recording surface in which the recording tracks 22 are disposed. The video disc 21 is disposed on a spindle 27 and is rotated by a motor 28.

When reading the video disc, use is made of a beam 15R which is reflected by the recording tracks. This beam traverses the objective, is reflected by the mirror 24 and is subsequently separated from the beam 15 emitted by the source 23, for example by means of a semi-transparent mirror 25, which reflects the beam 15R to a radiation-sensitive detection system 26. As the video disc is rotated by the spindle 28 which is driven by the motor 27, the intensity of the beam 15R varies with a high frequency in conformity with the information stored in the recording track.

In equipment in which information is to be recorded, the intensity of the beam 15 may be modulated in conformity with the information to be recorded. For this purpose a modulator 29, for example an electro-optical or an acousto-optical modulator, may be arranged in the radiation path. The signal to be recorded is applied to the input terminals 30A, 30B. If the light source is a diode laser, this laser may be modulated directly and no separate modulator is needed.

For reading the recording tracks the detection system 26 may in principle comprise one radiation-sensitive detector, which converts the intensity modulation of the beam 15R into an electric signal. A tracking system is necessary to correct the position of the radiation spot 16 relative to a recording track. A deviation of the position of the centre of the radiation spot relative to the recording track may, be detected, for example, in the manner shown in FIG. 5. The detection system 26 in this Figure comprises two detectors 26A and 26B, which are arranged adjacent each other in the X-direction, that is in the direction transverse to the recording tracks. The output signals of these detectors are applied to the inputs of a differential amplifier 31, on whose output a positional-error signal 82 is available. This signal is applied to a controller 52 which controls actuator means 33 by means of which the objective system can be translated along the X-axis. If the radiation spot 16 has shifted to the left or the right relative to the centre of a recording track, one of the detectors, 26A or 26B, respectively, receives a greater radiation intensity than the other, so that the signal S2 increases or decreases, respectively. As a result of this the objective holder is moved to the right or to the left, respectively.

By adding the signals from the detectors 26A and 26B in a summing device 34 a signal Si is obtained, which contains the information read. This signal is applied to an electronic processing circuit 35, which makes the signal suitable for reproduction by means of a television set.

During read-out with the minute light spot 16, correct focussing of the radiation beam 15 at the recording surface should be checked constantly. FIG. 5 represents a focussing servo-system known per se. By means of a semitransparent mirror 36 a part of the reflected beam 15R is routed to a second radiation-sensitive system 37. By means of a lens 38 the beam 29 is focussed at a wedge 40. This wedge splits the beam into two sub-beams 39A and 39B, the directions of said beams being dependent on the degree of focussing of the beam 15 at the recording surface. The detection system 37 comprises four detectors 37A to 37D. The signals from the detectors 37A to 37D are together applied to a first input of a differential amplifier 41 and the signals from detectors 37B and 37C are applied to a second input of said amplifier. The error signal Sf supplied by the differential amplifier is applied to a controller 42. The controller 42 controls the actuator current through the actuator coils 19. If the beam 15 is focussed exactly at the recording surface, the beam 39 is focussed exactly at the apex of the wedge 40 and the respective beam 39A or 39B is symmetrically incident on the detectors 37A, 37B or 37C, 37D respectively and the signal Sf is zero. When the light spot 16 is moved along the Z-axis the two beams 39A and 39B move inward or outward, depending on the direction of movement of the light spot and the actuator current through the actuator coil 19 is varied.

By means of the tracking system described in the foregoing the position of the light spot 16 can be corrected very accurately in the radial direction, that is in the X-direction. This system is intended for fast fine control and has a small range. In practice, this fine control system will be combined with a coarse control system. This is a second tracking system which provides coarse control of the radial position of the light spot. This second tracking system comprises a system for controlling the position, in the X-direction, of a carriage on which the frame 10 is mounted. This means that the frame in the video disc player is semi-stationary.

It is desirable to measure translations of the objective holder 11 along the X-axis relative to the semi-stationary frame 10, in order to ascertain whether during reading the fine control system is approaching the end of its control range, which is a few mm at the most, so that a signal for rendering the coarse control system operative is obtained. Furthermore, when the video disc is started, and does not yet supply a signal S2, it is desirable to measure the position of the objective holder, so that it can be set to its centre position relative to the frame. In accordance with the invention, it is further necessary to have an objective-position measuring device for measuring the position of the objective holder 10 relative to the frame 11 with respect to the three undesired rotations about the X, Y and Z-axes and for generating positional-error signals.

For simultaneously measuring the translation and the rotations of the objective holder relative to the frame, a prism 43 is arranged on the objective holder. This prism forms part of an objective-position measuring device, which is schematically represented in FIG. 6. It has been assumed that the refracting edge 46 of the prism should be disposed in the Y-Z plane and should be parallel to the Z-axis. An auxiliary radiation source 44, for example a diode laser, emits a radiation beam 45, which is incident on the prism 43. If the beam is incident on the refracting edge 46 of the prism, two sub-beams 45A and 45B are formed, which are reflected to two detectors 47 and 48. Each of these detectors comprises four sub-detectors 47A to 47D and 48A to 48D respectively. The two separating lines of the sub-detectors respectively extend transversely of the refracting edge 46 of the prism 43 and in the longitudinal direction thereof. The detectors are arranged on a common support 49, in which a hole is formed for the passage of the beam 45. A lens 50 converts the diverting beam 45 into a parallel beam. Th radiation source 44 is also arranged on the support 49.

If the objective holder occupies its centre position along the X-axis, the centre of the radiation beam 45 is exactly incident on the refracting edge 46 of the prism 43. The radiation spots 51 and 52 formed on the detectors 47 and 48 by the reflected beams 45A and 45B then have the same intensity. If the objective holder is out of its centre position, the beam 45 is asymmetrically incident on the prism and one of the reflected beams 45A and 45B will convey more radiation energy then the other.

If the detectors are correctly aligned relative to the radiation source 44 and the refraxting edge 46 of the prism 43 is parallel to the Z-axis, the radiation spots 51 and 52 will be disposed symmetrically relative to the respective detectors 47A to 47D or 48A to 48D. The arrangement shown enables translations along the X and Y-axes and rotations about the three axes, X, Y and Z to be measured simultaneously.

If the positional error signals for the said translations are designated $S_{TX}$ and $S_{TY}$ and those for the undesired rotations are designated $S_{RX}$, $S_{RY}$ and $S_{RZ}$, the signals from the detectors being designated $S_{47A}$, $S_{47B}$ etc., the relationships between these signals are as follows:

$$S_{TX} = (S_{47A} + S_{47B} + S_{47C} + S_{47D}) - (S_{48A} + S_{48B} + S_{48C} + S_{48D})$$

$$S_{TY} = (S_{47A} + S_{47D} + S_{48B} + S_{48C}) - (S_{47B} + S_{47C} + S_{48A} + S_{48D})$$

$$S_{RX} = (S_{47A} + S_{47B} + S_{48A} + S_{48B}) - (S_{47C} + S_{47D} + S_{48C} + S_{48D})$$

$$S_{RY} = (S_{47A} + S_{47B} + S_{48C} + S_{48D}) - (S_{47C} + S_{47D} + S_{48A} + S_{48B})$$

$$S_{RZ} = (S_{47A} + S_{47D} + S_{48A} + S_{48D}) - (S_{47B} + S_{47C} + S_{48B} + S_{48C})$$

Only the last three positional error signals are of interest for the present invention, because they relate to movements in accordance with the three undesired degrees of freedom of the objective holder 11. For adding and subtracting the detector signals a circuit 71 as shown in FIG. 7 may be used. The circuit comprises a number of adder amplifiers, represented by squares, and a number of subtractor amplifiers, represented by triangles, and requires no further description.

Eight actuator coils 53A,B to 56A,B are arranged on the frame 10. These coils belong to electromagnetic actuator means, which in addition comprise four ferromagnetic armatures 57 to 60 which are disposed at equal diametrical distances from the optical axis 13 and which are uniformly spaced along the circumference. Each armature comprises two teeth 57A,B to 60A,B which extend in substantially tangential directions and, viewed along the optical axis 13 of the objective, are disposed at some axial distance from each other. The actuator coils 53A, B to 58A, B have an elongate shape in the axial direction, so that the armature teeth have some axial freedom of movement in the actuator coils. The actuator coils have turns which are disposed substantially in planes which extend through the optical axis 13 of the objective and each have a central opening in which the associated armature tooth is situated with such a clearance that the objective holder 11 is movable to a limited extent in accordance with all the degrees of freedom. The objective holder 11 is annular and consists of a ferromagnetic material. Between the armatures 57 to 60 and the objective holder 11 radially magnetized permanent magnets 61 to 64 are arranged. Thus, some of the turns of each actuator coil are situated between an armature tooth and the annular ferromagnetic objective holder and consequently in a permanent magnetic field which extends radially from the armature teeth to the ferromagnetic objective holder.

The objective holder 11 can be subjected to electromagnetic actuator forces for driving the objective holder in the desired directions of movement, that is, translations along the X-axis and the Y-axis. For a movement of the objective holder 11—and thus of the objective 12—in accordance with the X-axis electric actuator currents of equal magnitude are simultaneously applied to the actuator coils 55A and 55B. The actuator coils 53A and 53B receive actuator currents of opposite polarity and equal absolute magnitude. In a similar way the objective holder can be moved in accordance with the Y-axis by means of the actuator coils 54A,B and 56A, B.

In the opto-electronic apparatus shown in FIGS. 2 to 4 the bearing arrangement for the objective holder 11 comprises a number of electromagnetic bearing means which are connected to the frame 10 and the objective holder 11 respectively and which electromagnetically cooperate with each other via air gaps, for counteracting the undesired rotations about the X-axis, the Y-axis and the Z-axis by means of electromagnetic levitation forces. The actuator coils 53A,B to 56A,B in this apparatus also serve as levitation coils, for which reason they are referred to hereinafter as combination coils. All bearing means for counteracting movement of the objective holder 11 in accordance with the undesired degrees of freedom exclusively comprise electromagnetic bearing means, so that the objective holder 11 is only supported on the frame 10 by electromagnetic actuator forces and electromagnetic levitation forces.

Said positional error signals ($S_{RX}$, $S_{RY}$ and $S_{RZ}$) from the objective-position measuring device (see FIG. 7) are each applied to a levitation control circuit, which compares the positional error signal with a reference signal of predetermined value and which comprises an output for applying electric levitation currents whose values depend on the error signal to the relevant combination coils in order to maintain the position of the objective 12 relative to the frame 10 in accordance with the relevant undesired degree of freedom substantially constant.

How the appropriate levitation forces are exerted on the objective holder 11 by means of a levitation control circuit and by means of combination coils will be described, by way of example, with reference to FIG. 8. The signal $S_{RX}$ is applied to a symbolically represented electronic controller $C_{RX}$. The controller compares the signal $S_{RX}$ with a signal $F_{RX}$ of preset value. Since it will generally be desirable to maintain the objective holder in a position which is as level as possible relative to the frame, the signal $F_{RX}$ will have a value which corresponds to this level position, for example a value 0. The controller $C_{RX}$ comprises two outputs 65 an 66 and generates levitation currents of equal absolute value but opposite sign $L_{CRX}$ and $-L_{CRX}$ on the two outputs 65 and 66. Each of these levitation currents is applied to two combination coils. One of the two levitation currents is applied to the two combination coils 53A and 55A and the other levitation current is applied to the two combination coils 53B and 55B. As a result of this the teeth 57A and 59A are subject to a tangential electromagnetic force which is opposite but equal in absolute magnitude to the electromagnetic forces exerted on the teeth 57B and 59B. Consequently, a torque is exerted on the objective holder 11 which counteracts the undesired rotation. Rotations about the Y-axis are counteracted in a similar manner. For rotations about the Z-axis use can be made of a controller having only one output, the levitation current being applied to all eight combination coils in equal proportion.

The objective-position measuring device described in the foregoing with reference to FIGS. 5 to 7 has already been described in U.S. Pat. No. 4,425,043. However, the use of said objective-position measuring device in a levitation control circuit as described here is novel, some of the positional error signals produced being employed in order to maintain an objective holder in a substantially invariable position relative to a frame by means of levitation coils, in other words for use in an electromagnetic bearing arrangement of an objective holder in a frame.

In FIGS. 5 and 6 the prism 43 is shown in a position relative to the X-axis, the Y-axis and the Z-axis such that, as already stated, the refracting edge 46 of the prism is disposed substantially in the Y, Z-plane and parallel to the Z-axis. As in FIG. 4, this is not readily possible with the opto-electronic apparatus described so far, because the X-axis and the Y-axis intersect with the coils 53A,B to 56A,B so that these coils form an impediment to the light beam 45. Therefore, the prism 43 is arranged at an angle α relative to the X-axis. This gives rise to a complication as regards the control method. Viewed from the support 49, the refracting prism 46, when the objective holder 11 moves along the X-axis, does not only move in the X-direction but also in the Y-direction, the displacement in the Y-direction being related to the displacements in the X-direction in accordance with a sine function. Since the angle α has a fixed value compensating measures may be taken in the circuit of FIG. 7. As these measures fall beyond the scope of the present description and are obvious to those skilled in the art of control technology, they will not be described in more detail.

As can be seen in FIG. 4 the frame 10 has such recesses 67 to 70 adjacent the pole shoes such that the objective holder 11 can be manually positioned, by a small rotary movement about the Z-axis, so that the armature teeth no longer project into the combination coils. The objective holder can then be removed from the frame in accordance with the Z-axis. Since no electrical wiring is connected to the objective holder, this embodiment is highly suitable in those cases in which objectives should be rapidly and readily exchangeable.

Another embodiment of an opto-electronic apparatus in accordance with the invention will now to described with reference to FIGS. 9 to 13. This embodiment also concerns an apparatus in which all bearing means for counteracting movements of the objective holder in accordance with undesired degree of freedom only comprise electromagnetic bearing means. The objective holder 72 is supported on the frame 73 only by electromagnetic actuator forces and by electromagnetic levitation forces. The objective comprises a single aspherical lens 74. The undesired degrees of freedom comprise rotations about the X-axis and about the Y-axis. Rotations about the Z-axis do not affect the optical operation of the apparatus and are therefore regarded neither as desired nor as undesired movements. For this reason no bearing means are provided which counteract rotations about the Z-axis. The Z-axis coincides with the optical axis of the lens 74.

The objective holder 72 comprises a ferromagnetic mounting ring which is concentric with the optical axis of the objective 74. The lens is glued into the mounting ring. All actuator coils and levitation coils are rigidly mounted on the frame 73 and cooperate magnetically with the ferromagnetic ring 72. In the bottom of the frame 73 an opening 75 is formed for the passage of a light beam. At the top of the frame a cover 76 is arranged with an opening 77 for the light beam. Inside the box-shaped assembly comprising the frame 73 with the cover 76 three ferromagnetic yokes 78, 79 and 80 are arranged. The yoke 78 carries eight combination coils 81 which serve as actuator coils and as levitation coils. On the axially opposite side of the mounting ring 72 identical combinations coils 82 are arranged on the yoke 80. The coils 81 and 82 are arranged around limbs 83 and 84 respectively of the yokes 78 and 80 respectively. Said coils exert axially opposed magnetic force components on the mounting ring 72. The yoke 79 carries eight combination coils 85 which are arranged around limbs 86 of the yoke 79. These combination coils exert diametral forces on the mounting ring 72, combination coils 85 situated on different diametrical sides of the mounting ring exerting diametrically opposed magnetic force components. The special feature of this embodiment of the invention is that no permanent magnets are used and that the objective holder 72 with the objective 74 is kept floating within the frame 73 by means of electromagnetic forces only, which forces are exerted on the mounting ring 72 in opposite directions. For moving the objective holder in the direction of the Z-axis equal currents must be applied to all the coils 81 and all the coils 82 should also be energized with mutually equal currents. For tilting the objective holder about the X-axis different currents should be applied to those coils 81 which are diametrically opposed in the Y-direction, equal currents being applied to coils which are diametrically opposed in the X-direction. The same applies to the coils 82. Tilting about the Y-axis is possible in a similar way. Translations in the X-direction or in the Y-direction are effected by applying mutually different currents to diametrically opposite coils 85 on the yoke 79.

The position of the objective ring 72 relative to the frame 73 in accordance with all the degrees of freedom, except for rotations about the Z-axis, are measured by means of a capacitive objective-position measuring device. At the top of the objective holder an annular plate 87 of an electrically conductive material is arranged, an identical plate 88 being arranged at the bottom. A cylindrical plate 89 is arranged along the entire circumference. Opposite the plate 97 four stationary plates 90 are arranged on the yoke 80 an opposite the plate 88 four identical stationary plates 91 are arranged on the yoke 78. These stationary plates are disposed between the limbs 84 of the yoke 80 and between the limbs 83 of the yoke 78 respectively. Between the limbs 86 of the yoke 79 four stationary plates 92 are disposed. Each of these stationary plates constitutes a capacitive element with the facing movable plate on the objective holder 72. The capacitance of each of these capacitive elements depends on the distance between the plates. For each of the five degrees of freedom which are of importance there is provided an objective-position measuring device. Two of these objective-position measuring devices are only used for counteracting the undesired rotations about the X-axis and about the Y-axis and are included in levitation control circuits. The other objective-position measuring devices have functions in the actuator control circuits for controlling the position of a read spot relative to a recording track in an information carrier. The electronic part of an objective position measuring device will be described with reference to FIGS. 11 and 12. For the sake of convenience identical parts in FIG. 11 which are situated to the left and right of the Z-axis in the drawing are distinguished from each other by affixing an L or an R respectively to the reference number.

The stationary plates 90L and 91L are connected to an objective-position measuring device 93L and the stationary plates 90R and 91R are connected to an identical objective-position measuring device 93R. FIG. 12 shows the structure of an objective position measuring device 93 in greater detail. The objective ring 72 may be regarded as being grounded because of its comparatively high capacitance relative to its surroundings. A voltage is induced into a coil T by a high-frequency voltage source a, which may be common to a plurality of objective-position measuring devices. The voltage induced in T causes equal currents through the two capacitances constituted by the capacitive elements 87–90L and 88–91L. Since the stationary plates 90L and 91L have equal surface areas the dielectric strain and thus the field strength in the two capacitive elements is the same. Therefore, the voltages across the capacitive elements are proportional to the distance between the relevant plates, their sum being constant.

These voltages are rectified with opposite sign by means of two diodes D1 and D2 and are added to each other at the junction U of a bridge comprising two identical resistors R. The voltage S on this junction is therefore proportional to the difference of the voltages across the capacitive elements and hence proportional to the position of the objective ring 87 relative to the frame in accordance with the Z-axis. The output signal S is zero if the objective holder 72 is in a centre position.

The output signals SL and SR appearing on the respective outputs UL and UR of the objective-position measuring devices 93L and 93R respectively are used as positional error signals in the levitation control circuit shown in FIG. 11 for counteracting rotations about the X-axis. The circuit of FIG. 11 comprises two types of loop: the loops partly designated A belong to the levitation control circuit which counteracts rotations about the X-axis and the loops with the designation B belong to a Z-axis actuator control circuit which responds to a positional error signal $E_z$ generated elsewhere (applied to an amplifier $V_3$). For explaining the operation it is assumed that the levitation control circuit is in a balanced condition. Assume that the objective now rotates about the X-axis, for example anti-clockwise. The output signal $S_R$ increases and the output signal $S_L$ decreases to the same extent. The two signals are added to each other in an amplifier $V_2$ whose output signal does not vary; consequently, the loop does not become active. In a differential amplifier $S_R$ and $S_L$ are subtracted from each other. A first output signal $S_R - S_L$ increases and a second output signal $-(S_R - S_L)$ decreases. An amplifier $V_4$ raises the levitation current through the coil 81R and reduces the levitation current through the coil 82A. An amplifier $V_5$ reduces the levitation current through the coil 81L and raises the levitation current through the coil 82L.

This results in a downward levitation force at the right-hand side of the objective and an upward levitation force at the left-hand side. The torque exerted by these forces counteracts the original rotary movement and returns the objective holder to its neutral position relative to the frame.

In a similar way an upward translation of the objective along the Z-axis results in an equal increase of the two output signals $S_L$ and $S_R$. The output signals of the differential amplifier $V_1$ consequently do not change. Added in amplifier $V_2$ and inverted in amplifier $V_3$, they produce a signal $E_2 - \frac{1}{2}(S_L + S_R)$ which causes an equal increase of the actuator currents in the coils 81L and 81R and an equal decrease of the actuator currents in the coils 82L and 82R. As a result of this, a downward actuator force is exerted, which corrects the position of the read spot relative to the recording surface in accordance with the X-axis. In order to obtain control circuits with suitable responses the use of appropriate filter networks and suitable linearization of the loops by means of bias currents in the coils are essential. These and other steps are obvious to those skilled in the art of control technology and are therefore not discussed in more detail.

The opto-electronic apparatus of FIGS. 13 to 17 comprises an objective holder 94 with an objective 95. For focussing a radiation beam, the objective is movable along a Z-axis which coincides with the optical axis. The desired degrees of freedom are the translations along the Z-axis and the translations along the X-axis for tracking purposes. The objective holder 94 is arranged in a semi-stationary frame 96. By means of a number of ball-bearings 97, said frame is movable in the X-direction on a stationary frame 98 of a small optical recorder for inscribing and reading digital data recording tracks in the reflecting recording surface of a rotating digital data disc 99 by means of a laser beam as shown in FIGS. 15 and 16. By means of a motor 100 said disc can be rotated about an axis 101 parallel to the Z-axis. The semi-stationary frame 96 is driven relative to the stationary frame 98 in the X-direction by means of a belt 102 and a servo-motor, not shown.

The objective holder 94 is only movable relative to the frame 96 in accordance with the X and the Z-axis, so that all movements in accordance with the two desired degrees of freedom are performed in a single plane of movement, namely the X-Z plane. For electromagnetically driving the objective holder 94 in accordance with the A-axis and for electromagnetically counteracting movements in accordance with an undesired degree of freedom in said X-Z plane, namely rotations about the Y-axis, there are provided combined electromagnetic means. These means comprise two combination coils 103A and 103B on one side of the objective holder 94 and two identical combination coils 104A and 104B on the other side, so that the combination coils, viewed along the X-axis, are arranged in pairs and spaced from each other. The combination coil 104B is not visible in the drawing but is disposed opposite the combination coil 103B, seen in the X-direction. For translations in the Z-direction there is provided an actuator coil 105 which is concentric with the Z-axis and thus with the optical axis of the objective 95. The objective holder 94 has a range of movement relative to the frame in the X-direction of a few millimeters at the most.

The three other degrees of freedom not yet mentioned, namely translations along the Y-axis, rotations about the Z-axis and rotations about the X-axis, are counteracted by mechanical bearing means. These bearing means only allow movements of the objective holder 94 in the X-Z plane. Said mechanical bearing means comprise two guide surfaces 106A and 106B on one side of the objective holder 94 and a guide surface 107 which, viewed in the Y-direction, is disposed on the other side of the objective holder. Said guide surfaces are parallel to the X-Z plane. The frame 96 comprises guide plates 108 and 109 which are coated with a low-friction material. The objective holder is movable between these guide plates with a small clearance. The electromagnetic bearing means only serve to counteract rotations about the Y-axis.

The objective-position measuring device comprises a prism 110 on the objective holder 94 and is, in principle, identical to that in the embodiment of the invention described with reference to FIGS. 2 to 8. FIG. 17 shows a permanent magnet 111 for cooperation with the actuator coil 105 and one of two permanent magnets 112 for cooperation with the combination coils 103A and 103B via yoke portions 112A and 112B respectively. For the combination coils 104A and 104B identical permanent magnets 117 and yoke portions are provided on the frame 96. The yoke portions fit into the combination coils with some clearance, so that they do not impede the limited movements of the objective holder 94 in the X-Z plane. The magnet 111 fits into the actuator coil 105 with clearance.

In the guide plate 108 an opening 114 is formed. This opening serves for the passage of a light beam, which is directed towards the prism 110 in the Y-direction and which is produced by an auxiliary light source. Via said opening the two sub-beams reflected by the prism 110 return to the two light-sensitive cells of the objective-position measuring device. It will be evident from the foregoing that by means of the four combination coils 103A to 104B force components in the X-direction and moments of force about the Y-axis can be exerted on the objective holder 94 by a tracking control circuit and a levitation control circuit respectively.

The opto-electronic apparatus which is schematically shown in FIG. 18 bears some resemblance to the apparatus described in the foregoing. Again the objective holder 114 has a mechanical bearing arrangement which only permits movements in the X-Z plane. However, the objective holder is suspended so relative to a stationary frame 115 that it is movable along the X-axis over a range which is sufficiently great for inscribing and/or reading recording tracks over the entire recording surface of a record carrier. In principle, this range may be extended at option. The objective holder 114 contains an objective 116 whose optical axis coincides with the Z-axis. A small light source, for example a semiconductor laser, is located inside the objective holder, which also accommodates all optical elements of the light path and the required opto-electronic elements. There are four sets of combination coils, namely 118A to 122A, 118B to 122B, 123A to 127A and 123B to 127B. Not all these coils are visible in the drawing. The coils 118A to 122A, viewed along the Y-axis, are disposed opposite the combination coils 123A to 127A. All these coils, viewed along the Z-axis, are disposed opposite the combination coils 118B to 121B and 123B to 127B respectively. Moreover, all combination coils, viewed along the X-axis, are spaced from the nearest combination coil. The electromagnetic forces which are exerted on the objective holder 114 by all these combination coils are all directed parallel to the X-axis. For the movements of the objective holder in the Z-direction there is provided an actuator coil 128. The frame 115 comprises four elongate stator magnets 129A,B and 130A, B. These magnets are arranged on ferromagnetic yokes, comprising guide portions 131A and 131B and end plates 132A and 132B. At the side facing the objective holder the guide portions 131A,B comprise guide surfaces which cooperate with the flat side faces of the objective holder, so this holder is movable with a small clearance between the guide plates in the X-Z plane only. The combination coils, leaving an air gap, move along the stator magnets 129A,B and 130A,B in slots 133A,B and 134A,B. The actuator coil 128 for the focussing moves in a slot 135 in a separate stator comprising an elongate permanent stator magnet 136 and two yoke plates 137A and 137B.

The combination coils are arranged adjacent each other in four sets of five, overlapping each other, the combination coils 118A to 122A and 118B to 122B being disposed in a first plane parallel to the X-Z plane and the combination coils 123A to 127A and 123B to 127B in a second plane parallel to the X-Z plane. The elongate permanent stator magnets 129A, B and 130A, B comprise a regular pattern of alternate areas of north and south polarity in the longitudinal direction, that is parallel to the X-axis. For driving the objective holder 114 in the direction of the X-axis the combination coils are electrically connected to commutation means which, in a manner known per se, commutate the electric currents to be applied to the combination coils, depending on the position and on the direcon of the movement along the X-axis. In this way, as is known, an efficient translational drive is possible. On a side face of the objective holder 114 a prism 138 is mounted, which prism belongs to an opto-electronic objective-position measuring device of the type already described. The auxiliary light beam is directed towards the prism 138 along the X-axis. The reflecting faces of the prism are arranged so that the reflected sub-beams are returned at a small angle with the X-axis. Even in the case of a large travel of the objective holder this prevents the reflected sub-beams from impinging on the guide portions 131A and B.

By means of the apparatus of FIG. 18 very short access times can be achieved. The objective holder 114 and the moving parts connected to it, such as the objective 116 and the combination coils, may have a very low mass. The combination coils or the actuator coil 128 do not subject the objective holder to force components acting in the Y-direction, so that extremely small frictional forces occur between the objective holder 114 and the guide surfaces of the guide portions 131A, B. Therefore, this embodiment seems to be particularly suitable for use in optical storage equipment.

FIGS. 19 and 20 relate to an embodiment of an opto-electronic apparatus in accordance with the invention, which again bears resemblance to the apparatus of FIGS. 13 to 17. The objective holder 139 contains an objective 140 and is made of a ferromagnetic material. The optical axis of the objective 140 again coincides with the Z-axis. The objective holder is movable in the X-Z plane, desired degrees of freedom being translations along the X-axis and the Z-axis and all the other degrees of freedom being undesired. The frame 141 again carries four combination coils 142A, B and 143A, B. The objective holder 139 carries an actuator coil 144 which is concentric with the Z-axis. By means of the four combination coils the objective holder 139 can be translated in the X-direction and rotations about the Y-axis can be counteracted electromagnetically. The actuator coil 144 only serves for translations along the Z-axis.

In direction parallel to the X-axis the objective holder 139 comprises pole shoes 145 and 146. They extend over substantially the entire height of the objective holder. They are integral with the other parts of the objective holder and are consequently also ferromagnetic. On the frame 141 ferromagnetic stator pole shoes 147A, B and 148A, B are arranged. They comprise free ends which, leaving an air gap, are disposed opposite the free ends of the pole shoes 145 and 146 of the objective holder 139. The combination coils are arranged on the stator pole shoes. These pole shoes are glued in pairs onto two permanent stator magnets 149 and 150, which are magnetized in the direction of the X-axis. The permanent magnets 149 and 150 are mounted on two iron brackets 151 and 152. Owing to the presence of the permanent magnets 149 and 150 a permanent magnetic field exists in the air gaps between the stator pole shoes and the objective pole shoes. The objective pole shoes 145 comprises teeth 151. The stator pole shoe 147A comprises teeth 152 which magnetically cooperate with the teeth 151 of the objective pole shoe. The other pole shoes have similar teeth. This results in a comparatively high magnetic rigidity in the Y-direction, so that no mechanical or electromagnetic bearing means are needed for counteracting translations of the objective holder 139 along the Y-axis or rotations about the X and the Z-axis. The studs 155 on the inner side of the brackets 151 and 152 only serve as safety stops.

A separate permanent magnetic stator 156 has been provided for cooperation with the actuator coil 144. Said stator comprises two disc-shaped permanent magnets 157 and 158 which are magnetized in opposite axial directions, an iron disc 159 glued between these magnets, a box-shaped iron housing 160 and a cover 161. The box-shaped yoke 160 has a central cylindrical portion 162 and the actuator coil 144 moves in the air gap between the disc 159 and the cylindrical portion 163. The permanent magnetic field extends radially via this air gap.

The frame 141 is mounted on the cover 161 of the stator 156 by means of two L-shaped brackets 163 and 164 and a number of screws 165.

The objective-position measuring device is again of the capacitive type. On the pole shoes 147A to 148B retaining rings 166A to 167B are fitted. On these rings metal plates 168A to 169B are arranged opposite the pole shoes 145 and 146 of the objective holder. Each of the metal plates forms a capacitive element with the surface of the facing pole shoe. By means of the four capacitive elements it is possible to measure translations along the X-axis and rotations about the Y-axis. The error signals relating to the rotations about the Y-axis are used in a levitation control circuit for counteracting said rotations by applying levitation currents to the combination coils.

What is claimed is:

1. An apparatus for inscribing and/or reading recording tracks in a recording surface of a record carrier with a radiation beam, which apparatus comprises:

a frame, an objective holder provided with an objective having an optical axis and having a lens system for concentrating the radiation beam so as to form a radiation spot in a focussing plane, a bearing arrangement for supporting the objective holder for movement relative to the frame in accordance with a desired number of degrees of freedom out of six theoretically possible, independent degrees of freedom, said bearing arrangement including means for counteracting those movements of the objective holder relative to the frame which are in accordance with the other, undesired degrees of freedom, and actuator means for producing electromagnetic actuator forces for driving the objective holder relative to the frame in accordance with said desired degrees of freedom, characterized in that:

the apparatus comprises an objective-position measuring device for continuously measuring the position of the objective holder relative to the frame in accordance with at least one of said undesired degrees of freedom and generating a positional error signal, said counteracting means comprises at least one levitation coil secured to one of said frame and objective holder and magnetic means arranged on the other of said frame and objective holder, said magnetic means, cooperating with said levitation coil via an air gap so as to produce an electromagnetic levitation force which counteracts undesired movement of the objective holder in accordance with at least one of said undesired degrees of freedom, and there is provided a levitation control circuit, which compares the positional error signal from the objective-position measuring device with a reference signal of specific value and which comprises at least one output for applying an electric levitation current whose value depends on the error signal to said levitation coil for maintaining the position of the objective relative to the frame in accordance with said undesired degree of freedom substantially constant.

2. An apparatus as claimed in claim 1, wherein said bearing arrangement supports the objective holder solely by electromagnetic forces and said actuator means includes at least one actuator coil for each desired degree of freedom.

3. An apparatus as claimed in claim 2, characterized in that the objective holder (11) is ferromagnetic and annular, at least three ferromagnetic armatures (57-60) are arranged on the objective holder at equal diametrical distances from the optical axis (13) and are uniformly spaced along the circumference of the holder, a radially magnetized permanent magnet (61-64) is arranged between each armature and the objective holder, that each armature comprises two armature teeth (57A,B to 60A,B) which extend in a substantially tangential direction and which, viewed along the optical axis (13) of the objective (12) are axially spaced from each other, for each armature tooth an axially elongated combination coil (53A, B-56A, B) is arranged on the frame, which coil functions both as an actuator coil and as levitation coil and comprises turns which are disposed substantially in a plane which extends through the optical axis (13) of the objective (12) and a central opening which receives the tooth with clearance, and for translations along the optical axis there is provided an actuator coil (19) which is concentric with the optical axis (FIGS. 2-4).

4. An apparatus as claimed in claim 3, characterized in that the objective holder (72) is at least partly made of a ferromagnetic material, and all actuator coils and levitation coils (81, 82, 85) are rigidly mounted on the frame (73, 76) and magnetically cooperate with ferromagnetic parts of the objective holder.

5. An apparatus as claimed in claim 4, characterized in that the objective holder (72) comprises a ferromagnetic mounting ring which is concentric with the optical axis (Z) of the objective (74), for movements in accordance with all the degrees of freedom of the objective, except for rotations about the optical axis, a plurality of coils (81, 82) which are situated on different axial sides of the mounting ring (72) and which exert axially opposite magnetic force components on the mounting ring, and a plurality of coils (85), which are situated on diametrically different sides of the mounting ring (72) and which exert diametrically opposite magnetic force components on the mounting ring, are arranged on the frame, which coils function as actuator coils, as levitation coils, or both as actuator coils and levitation coils.

6. An apparatus as claimed in claim 1, characterized in that the bearing arrangement only permits movements of the objective holder (94; 114; 139) relative to the frame in accordance with two desired degrees of freedom in a single plane of movement, one of the two desired degrees of freedom being along a first translation axis (Z) which coincides with the optical axis of the objective and the second degree of freedom being along a second translation axis (X) which is perpendicular to the first translation axis, and for electromagnetically driving the objective holder in accordance with the second translation axis and for electromagnetically counteracting movements of the objective holder in accordance with a third, in itself undesired, degree of freedom about an axis of rotation (Y) which is perpendicular to the first and second translation axes, said actuator means and said counteracting means comprise at least a first and a second combination coil (103A, 104A; 118A, 127A; 142A, 143A), which function both as actuator coils and as levitation coils, which two combination coils are spaced from each other, viewed along the second translation axis (X).

7. An apparatus as claimed in claim 6, characterized in that the objective holder (94–139) is movable relative to the frame (96; 141) along the second translation axis over a distance of not more than a few millimeters, that there are provided two sets of combination coils (103A–104A, 103B–104B; 147A–148A, 147B–148B), which are disposed at opposite sides of the objective holder, viewed along the first translation axis (Z), and there is provided an actuator coil (105–144) which is substantially concentric with the optical axis of the objective holder, for exerting actuator forces along the optical axis of the objective.

8. An apparatus as claimed in claim 7, characterized in that the objective holder (139) is provided with ferromagnetic objective pole shoes (145, 146) with free ends, which extend in directions parallel to the second translation axis (X), on the frame (141) there are arranged a plurality of ferromagnetic stator pole shoes (147A, B, 148A, B) with free ends, which are disposed opposite the free end of an objective pole shoe, thus forming an air gap, and said combination coils (142A, B, 143A, B) are arranged on the stator pole shoes.

9. An apparatus as claimed in claim 8, characterized in that the apparatus comprises at least one permanent magnet (149, 153) for producing a permanent magnetic field in the air gaps between the stator pole shoes and the objective pole shoes, the stator pole shoes and the objective pole shoes comprise teeth (153, 154) which face each other and magnetically cooperate with each other via the air gap, and the frame comprises a ferromagnetic yoke (151, 152) which magnetically couples the permanent magnets to the stator pole shoes.

10. An apparatus as claimed in claim 6, characterized in that the bearing arrangement, in order to permit only movements of the objective holder (94; 114) in a single plane of movement in accordance with the two said desired degrees of freedom (X-Z), comprises spaced guide surfaces (106A,B, 107–109; 114, 131A,B), parallel to said plane of movement, and movements of the objective holder which are not within said plane of movement (X-Z) and consequently are in accordance with the three other degrees of freedom, are substantially counteracted by the guide surfaces.

11. An apparatus as claimed in claim 10, characterized in that the objective holder (114) is movable relative to the frame (115) along the second translation axis (X) over a distance which suffices to write and/or read recording tracks over the entire recording surface of a record carrier, said at least two combination coils (122A, 123B), viewed along each of the two said translation axes (Z, X) and also along a third translation axis (Y) which is perpendicular thereto, are spaced from each other, the combination coils only exert electromagnetic forces on the objective holder which are directed parallel to the second translation axis (X), an actuator coil (128) is connected to the objective holder for exerting actuator forces which are directed parallel to the first translation axis, and the magnetic means comprise a plurality of elongated stator portions (129A, B, 130A, B) which are secured to the frame and extend along the second translation axis and which have a length which is at least equal to said distance of movement of the objective holder, said coils being movable relative to said elongate stator portions along the second translation axis in such a way that an air gap (133A, B, 134A, B) is left.

12. An apparatus as claimed in claim 11, characterized in that said at least first and second combination coils (122A, 123B) belong to a first set and a second set of combination coils (118A–122A, 123B–127B) respectively, which coils are disposed in first and second planes substantially parallel to the plane of movement of the objective holder and which are arranged adjacent each other, viewed in a direction parallel to the second translation axis, overlapping each other, said elongated stator portions comprise elongated permanent-magnetic stators (129A, B, 130A, B) on the frame, which stator portions have areas of alternate north and south polarity which extend in accordance with a regular pattern in the longitudinal direction, and there are provided commutation means for commutating the electric currents to be applied to the combination coils, depending on the position and the direction of movement of the objective holder (114), viewed along the second translation axis (X) (FIG. 18).

13. An apparatus as claimed in claim 1, characterized in that the objective-position measuring device comprises:

(a) two capacitive elements (90L–87; 88–91L) arranged in series and comprising facing stationary plates (90L, 91L) of an electrically conductive material on the frame and facing movable plates (87, 88) of an electrically conductive material on the objective holder, (b) a high-frequency alternating current source (a), (c) a voltage difference circuit, which is inductively coupled to the high-frequency alternating current source and connected to the two capacitive elements, and (d) means for applying the output signal ($S_L$) of the voltage difference circuit to the levitation control circuit.

14. An apparatus as claimed in claim 1, characterized in that the objective-position measuring means comprising (a) a radiation source (44) on the frame (10) for emitting a radiation beam towards the objective holder (11), (b) a radiation-sensitive detection system on the frame, which system comprises a plurality of detectors (47, 48), each divided into at least two subdetectors, the separating lines between the subdetectors being parallel to each other, (c) a beam-splitting optical element (43) on the objective holder for splitting the radiation beam (45) emitted by the radiation source in the direction of the radiation-sensitive detection system into subbeams (45A, B), the radiation-distribution among the sub-detectors being determined by the position of the optical element and thus of the objective holder relative to the frame, and (d) an electronic circuit for supplying positional error signals, which circuit comprises inputs which are each individually connected to a sub-detector of the detection system.

15. Apparatus for inscribing and/or reading recording tracks in a recording surface of a record carrier with a radiation beam, said apparatus comprising a frame, a holder, an objective for concentrating the radiation beam so as to form a radiation spot in a focusing plane, said objective having a optical axis and being mounted in said holder, means for supporting said holder on said frame for movement relative to said frame in a desired number of directions of movement out of six, independent directions of movement consisting of translational movement parallel to each of three orthogonal axes one of which coincides with said optical axis and rotational movement about each of said orthogonal axes, means for counteracting movement of said holder in at least one other, undesired, direction of movement, said counteracting means including a coil secured to one of said frame and holder and magnetic means arranged on the other of said frame and holder and cooperating with said coil to produce an electromagnetic force which opposes movement of said holder relative to said frame in said undesired direction of movement, means for moving said objective relative to said frame in each of said desired directions of movement, means for detecting displacement of said objective from a given position relative to said frame in said undesired direction of movement, said detecting means generating a positional error signal representative of said displacement, means responsive to said error signal for applying to said coil a current dependent on said error signal such that said electromagnetic force produced by said coil and said magnetic means moves said holder to said given position upon displacement therefrom.

16. The apparatus according to claim 15 wherein said holder is supported by said supporting means for translational movement along said one axis which coincides with said optical axis and for translational movement in a direction parallel to another of said three orthogonal axes, and wherein said counteracting means includes at least two of said coils spaced from each other along said another axis and two of said magnetic means each cooperating with a respective one of said coils so as to produce electromagnetic forces which oppose rotational movement of said holder about the third of said three orthogonal axis, said third axis being perpendicular to said one and said another axis.

17. The apparatus according to claim 16 wherein said moving means includes said coils which function both for opposing said rotational movement about said third axis and for moving said holder parallel to said another axis.

18. The apparatus according to claims 16 or 17 wherein said holder is supported by said supporting means for movement in a single plane defined by said one and said another axes.

* * * * *

UNITED STATES PATENT AND TRADEMARK OFFICE
CERTIFICATE OF CORRECTION

PATENT NO. : 4,561,081
DATED : December 24, 1985
INVENTOR(S) : Peter J.M. Janssen et al It is certified that error appears in the above-identified patent and that said Letters Patent is hereby corrected as shown below:

Column 24, Claim 12, line 23, delete "(FIG. 18)".

Signed and Sealed this

Eighth Day of November, 1988

Attest:

DONALD J. QUIGG

*Attesting Officer*  *Commissioner of Patents and Trademarks*